May 8, 1928. 1,668,618
J. H. WAGENHORST
METHOD OF MAKING AND ATTACHING CLAMPING LUGS TO RIMS
Filed June 27, 1924      2 Sheets-Sheet 1
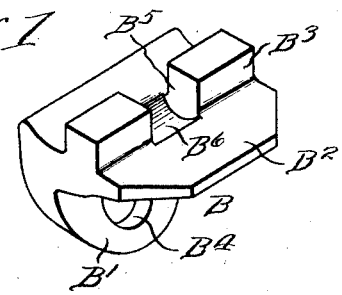
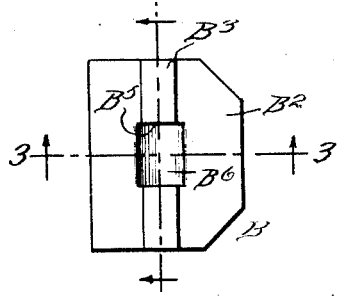
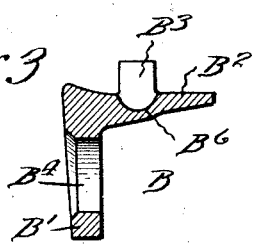
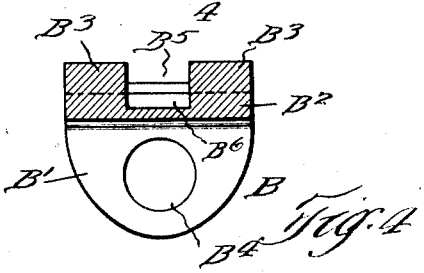
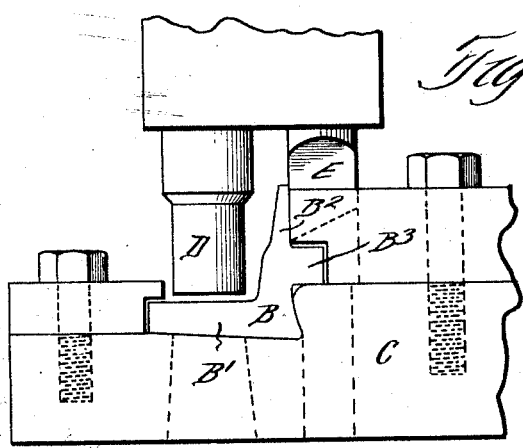
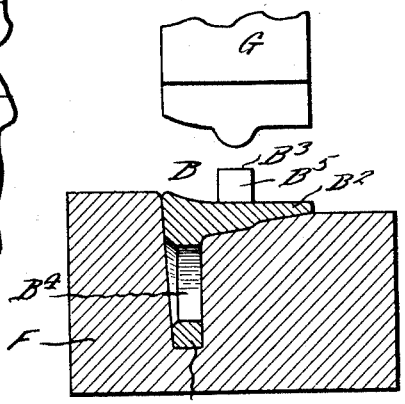
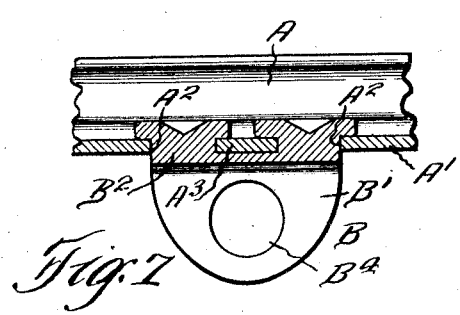
Inventor
J. H. Wagenhorst
By Hull Brock & West
Attys.

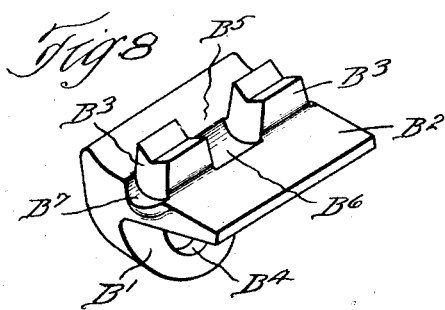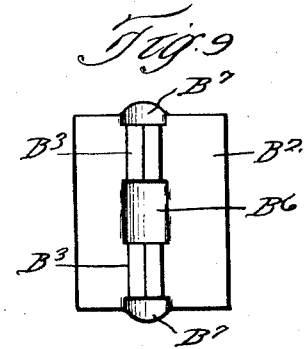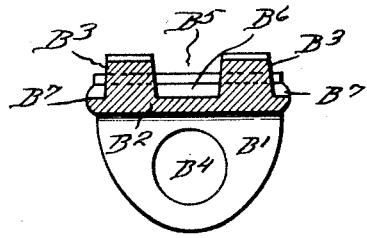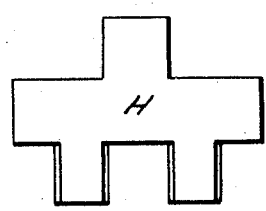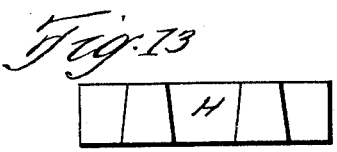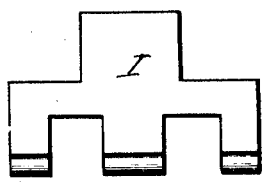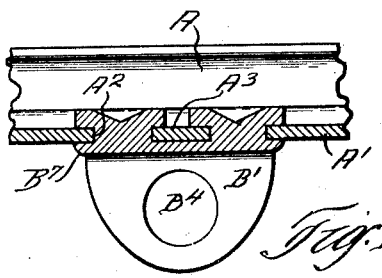

Patented May 8, 1928.

1,668,618

UNITED STATES PATENT OFFICE.

JAMES H. WAGENHORST, OF JACKSON, MICHIGAN.

METHOD OF MAKING AND ATTACHING CLAMPING LUGS TO RIMS.

Application filed June 27, 1924. Serial No. 722,672.

This invention relates generally to clamps attached to demountable tire carrying rims and more particularly to the method of making said clamps and connecting the same to the rims.

Clamps of this general nature are disclosed in my Patent No. 1,383,679, dated July 5, 1921 and also in my application filed April 19, 1923, Serial No. 633,123.

The present invention contemplates certain improvements in the method of making the clamps whereby they are made stronger than the clamps heretofore produced, and the invention also contemplates certain steps in the method of attaching the improved clamp whereby a more secure connection of the stronger clamp is provided.

With these various objects in view, the invention consists in the various detailed steps hereinafter fully described and set forth in the appended claims.

In the drawings forming a part of this specification, Fig. 1 is a view of the finished clamp; Fig. 2 is a plan view of the same; Fig. 3 is a section on the line 3—3 of Fig. 2; Fig. 4 is a section on the line 4—4 of Fig. 2; Fig. 5 is a view illustrating the manner of punching the bolt hole and providing spaced outwardly projecting lugs and Fig. 6 is a view showing the manner of producing the depression between the outwardly projecting lugs; Fig. 7 is a view showing the manner of connecting the lug to the rim base; Fig. 8 is a perspective view of a slightly modified form of clamp; Fig. 9 is a top plan view of the same; Fig. 10 is an end view of the same; Fig. 11 is a longitudinal sectional view of the same; Fig. 12 is a side view of a punch for cutting the rib in this modified form; Fig. 13 is a bottom view of the same and Fig. 14 is a side view of the punch for working the central and end depressions; and Fig. 15 is a sectional view showing the modified form of clamp attached to the rim.

In carrying out my invention I employ a demountable tire carrying rim A which may be of the clencher or straight side type and the rim is preferably formed with an inrolled bead A′ in the base thereof, but if desired, the base can be formed with an inwardly projecting rib or the base can be devoid of bead or rib and made perfectly flat.

The rim base has spaced apertures $A^2$ produced therein, at definite points, leaving an intervening or bridge portion $A^3$ between the apertures. When the rim base is formed with an inrolled bead or an inwardly projecting rib, these apertures $A^2$ are made in the bead or rib, and when a flat rim base is employed they are made in the flat rim base in the same relative position as the inrolled bead or rib.

A demountable tire carrying rim constructed as above described has a series of clamps B connected thereto and this invention relates particularly to the method of making these clamps and to the method of connecting the clamps to the rim and I will now describe the manner of attaching them to the rim base.

The clamps are made from a hot rolled bar which is substantially angular in form. Each clamp cut from the bar has an inwardly projecting member B′ and a laterally projecting member $B^2$ and the outer face of the laterally projecting member is formed with an outwardly projecting rib $B^3$. The clamp as thus formed is placed upon a suitable die C and then by suitably shaped punches D and E I punch the bolt opening $B^4$ in the inwardly projecting member B′ and I punch out a portion of the rib $B^3$ as indicated at $B^5$ thereby producing at one operation the bolt hole in the inwardly projecting member and providing spaced outwardly projecting lugs upon the laterally extending member.

The clamp as thus far made is then placed in another die F and by means of a suitably shaped punch G, I punch a depression or recess $B^6$ in the outer face of the member $B^2$ between the outwardly projecting lugs and this is accomplished without perforating or fracturing member $B^2$.

This depression or recess is of sufficient depth to receive the inwardly projecting bridge portion $A^3$ when the clamp is connected to the rim and this connection is effected by passing the outwardly projecting lugs through the spaced apertures $A^2$ and then splitting and heading or riveting down the ends of the lugs into the inrolled bead when it is present, or onto the rim base, and when the clamp is thus placed in juxtaposition with the rim base, the inwardly projecting bridge portion $A^3$ fits into the depression $B^6$ and the depression thus serves as a support or anvil while the ends of the lugs are being riveted over into that portion of the bead.

In case the rim base is flat, I may press the bridge portion A³ inwardly into the depression before the ends of the lugs are headed or riveted down.

By producing the depression or recess at the point indicated, and without perforating or fracturing the metal, I provide a much stronger clamp than those heretofore employed, and by virtue of this depression between the outwardly projecting lugs, and into which the bridge portion A³ fits, I provide a much more intimate and secure connection between the clamp and the rim than has heretofore been obtainable.

In Figs. 8 to 11 I have shown a slightly modified form of clamp and in Figs. 12 to 14 have illustrated the punches for cutting and shaping such modified form.

In this modified form the ends of the rib B³ are sheared off and depressions B⁷ are made at each end and it will be noted that the stock is pressed out at each end where the depression B⁷ is made. In other respects, the clamp is the same, and the manner of securing it is the same, but by having the additional end depressions B⁷ a firmer and more intimate contact between the bead of the rim and the face of the clamp is obtained.

Fig. 12 is a side view of punch H for cutting the rib B³ at B⁵ and at the same time shearing off the ends, and Fig. 13 is a bottom view of this punch; Fig. 14 shows the punch 1 for making the central depression B⁶ and also the end depressions B⁷; Fig. 15 shows a clamp of the kind attached to the rim and the end extensions and depressions make a lighter connection as most clearly illustrated at the ends of the clamp.

It will thus be seen that I provide a simple and improved method of making the novel construction of clamp and also an improved method of connecting such clamps to the rim base.

Having thus described my invention what I claim is:—

1. The hereindescribed method of making clamps which consists in providing an angular body having an outstanding rib, removing a part of said rib to provide spaced outwardly projecting lugs, providing a bolt hole in said clamp and also providing a depression in the metal of the clamp between the outwardly projecting lugs.

2. The hereindescribed method of making clamps which consists in providing an angular body having an outstanding rib upon one member thereof, punching a bolt hole in one member and removing a portion of said outstanding rib and providing spaced outwardly projecting lugs and then producing a depression in the metal of the clamp between said outwardly projecting lugs.

3. The hereindescribed method which consists in providing a rim with spaced apertures and an intervening bridge portion, providing a clamp having outwardly projecting lugs and a depression intermediate said lugs, bringing said clamp into juxtaposition with said rim base and projecting the outwardly projecting lugs through the spaced openings in the rim base, and positioning the intermediate bridge portion in the depression between the lugs and riveting or heading down the ends of said lugs.

4. The hereindescribed method which consists in providing a rim having an inrolled bead, with spaced apertures at definite points, providing clamps, each having spaced outwardly projecting lugs and a depression between said lugs, bringing said clamps and rim base into juxtaposition with the outwardly projecting lugs through the spaced openings in the inrolled bead of the rim base, the intermediate bridge portion of the rim base positioned in the depression between the outwardly projecting lugs, and then riveting down the ends of said lugs into the inrolled bead of the rim base.

5. The hereindescribed method of making clamping lugs which consists in providing a rolled angular body having an outstanding rib upon one member thereof, punching a bolt hole in one member, and removing portions of said outstanding rib and providing spaced outwardly projecting lugs and then producing a depression in the metal of said clamp between said outwardly projecting lugs and at each end thereof.

In testimony whereof, I hereunto affix my signature.

JAMES H. WAGENHORST.